US010541872B2

(12) United States Patent
Mentze et al.

(10) Patent No.: US 10,541,872 B2
(45) Date of Patent: Jan. 21, 2020

(54) NETWORK POLICY DISTRIBUTION (71) Applicant: HEWLETT PACKARD ENTERPRISE DEVELOPMENT LP, Houston, TX (US)

(72) Inventors: Duane E. Mentze, Roseville, CA (US); Charles F. Clark, Roseville, CA (US); Shaun Wackerly, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 313 days.

(21) Appl. No.: 15/507,461

(22) PCT Filed: Mar. 31, 2015

(86) PCT No.: PCT/US2015/023474
§ 371 (c)(1),
(2) Date: Feb. 28, 2017

(87) PCT Pub. No.: WO2016/159964
PCT Pub. Date: Oct. 6, 2016

(65) Prior Publication Data
US 2018/0227184 A1    Aug. 9, 2018

(51) Int. Cl.
G06F 15/173   (2006.01)
H04L 12/24    (2006.01)
H04L 29/06    (2006.01)

(52) U.S. Cl.
CPC .......... H04L 41/0893 (2013.01); H04L 41/20 (2013.01); H04L 69/18 (2013.01)

(58) Field of Classification Search
CPC ..... H04L 41/0893; H04L 69/18; H04L 41/20; H04L 41/0816
See application file for complete search history.

(56) References Cited

U.S. PATENT DOCUMENTS 7,433,944 B2   10/2008  Kanada et al.
9,712,331 B1*   7/2017  Poh ..................... H04L 12/1407
(Continued)

FOREIGN PATENT DOCUMENTS

EP         2782291 A1    9/2014
KR    10-2014-0102398 A    8/2014
(Continued)

OTHER PUBLICATIONS

International Search Report and Written Opinion, International Application No. PCT/US2015/023474, dated Feb. 18, 2016, pp. 1-10, KIPO.
(Continued)

Primary Examiner — John B Walsh
(74) Attorney, Agent, or Firm — Brooks, Cameron & Huebsch, PLLC (57) ABSTRACT

Example implementations relate to network policy distribution. For example, a system for network policy distribution can include a state engine to determine a change in a state of a network, a policy engine to determine a number of policy changes based on the change in the state of the network, an identification engine to identify a number of network endpoints that correspond to the number of policy changes, and a distribution engine to load instructions based on the number of policy changes to the number of endpoints that correspond to the number of policy changes.

15 Claims, 7 Drawing Sheets (56) References Cited

U.S. PATENT DOCUMENTS

| | | | |
|---|---|---|---|
| 9,923,924 B2* | 3/2018 | Clark | H04L 63/20 |
| 2004/0193912 A1* | 9/2004 | Li | G06F 21/55 |
| | | | 726/14 |
| 2005/0004942 A1 | 1/2005 | Madsen et al. | |
| 2009/0138577 A1 | 5/2009 | Casado et al. | |
| 2011/0072135 A1 | 3/2011 | Hannel et al. | |
| 2014/0089500 A1 | 3/2014 | Sankar et al. | |
| 2014/0126410 A1 | 5/2014 | Agarwal et al. | |
| 2014/0351439 A1 | 11/2014 | Madani et al. | |

FOREIGN PATENT DOCUMENTS

| | | |
|---|---|---|
| WO | WO-0199372 A2 | 12/2001 |
| WO | WO-2014153421 A2 | 9/2014 |

OTHER PUBLICATIONS

Ritu Chadha et al., "Scalable Policy Management for Ad Hoc Networks," Oct. 2005, pp. 1-7; IEEE.

Xitao Wen et al., "Compiling Minimum Incremental Update for Modular SDN Languages," Aug. 22, 2014, pp. 1-6, Available at: <cs.northwestern.edu/~xwe334/papers/compact_update_hotsdn.pdf>.

* cited by examiner

NETWORK POLICY DISTRIBUTION

BACKGROUND

Networks can include a plurality of resources connected by communication links, and can be used to connect people, provide services (e.g., internally and/or externally via the Internet and/or intranet), and/or organize information, among other activities associated with an entity. An example network can include a software-defined network (SDN).

DETAILED DESCRIPTION

Networks can include a plurality of resources such as databases and/or endpoint devices connected by communication links, and can be used to connect people, provide services (e.g., internally and/or externally via the Internet and/or intranet), and/or organize information, among other activities. Examples of endpoint devices include computers, tablets, phones, printers, cameras, door locks, HVAC controller, among other endpoint devices capable of operating on a network. An example network can include a software-defined network (SDN).

SDN controllers can direct network devices such as servers and/or computing devices on how to forward network traffic based on the input from various applications. Applications might simulate services on the network, they might be observing traffic in the network, such as with security applications, and so forth. For instance, one application can look for infected hosts on the network, while another application may attempt to optimize voice over internet protocol (VoIP) calls on the network. Both applications may run on the same SDN controller, and use the SDN controller to communicate with network devices in a native format. As used herein, a native format refers to a data format specific to a particular application. A native format can also be referred to as a protocol-specific format.

When applications within a network, such as an SDN, want to tell the same devices in the network what to do, a conflict may arise and in some cases, neither application may be permitted to instruct the devices. Further, as both applications may communicate with the devices using native protocols, additional difficulty may result in executing the actions of the protocols. In such instances, the SDN controller may be unable to determine which actions from which applications should be executed, and/or if the actions of both applications should be executed.

Also, network policies may be applied within the network, such as an SDN, and may be applied by particular protocols such as Access Control Lists (ACLs) and/or OpenFlow. These policies can be codified into the protocol-specific format, then input to an individual network component or a SDN controller. As used herein, a policy can refer to a set of match criteria with an accompanying action which should be taken on matching network traffic. In some examples, a number of policies can be merged into a number of merged orthogonal merged units (OMUs). The OMUs can be utilized to enforce network policy intent onto the network via the SDN controllers. The OMUs can enforce network policy by translating the OMUs to instructions (e.g., protocol-specific instructions, etc.) that can be loaded onto network devices of the network.

Changes to the network can include a number of policy changes. The number of policy changes can be distributed to a number of network devices. Previous systems and methods can include compiling all policies in response to the policy changes and then generate device code for the compiled policies. That is, previous systems and methods can compile all policies including the policy changes and distribute new policies to all network devices within the network. The network policy distribution as described herein can compile only policy changes (rather than compiling all policies) and distribute the policy changes to corresponding network devices that are relevant to the policy changes.

Figure 1:
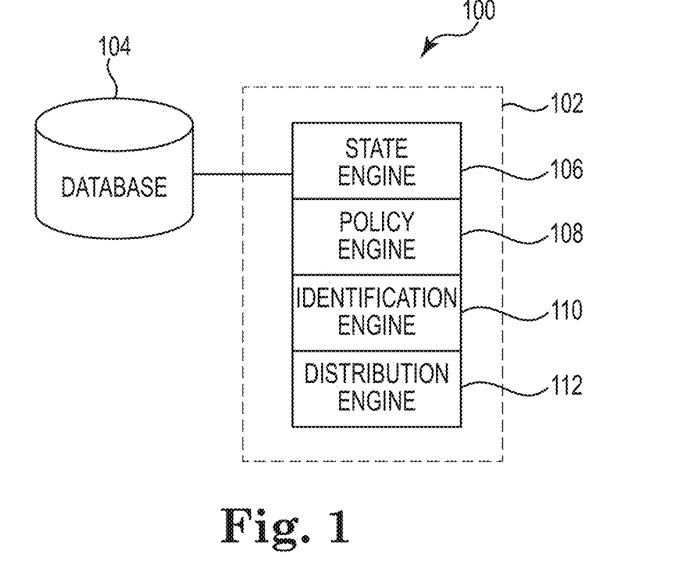
FIG. 1 illustrates a diagram of an example of a system according to the present disclosure.
Figure 2:
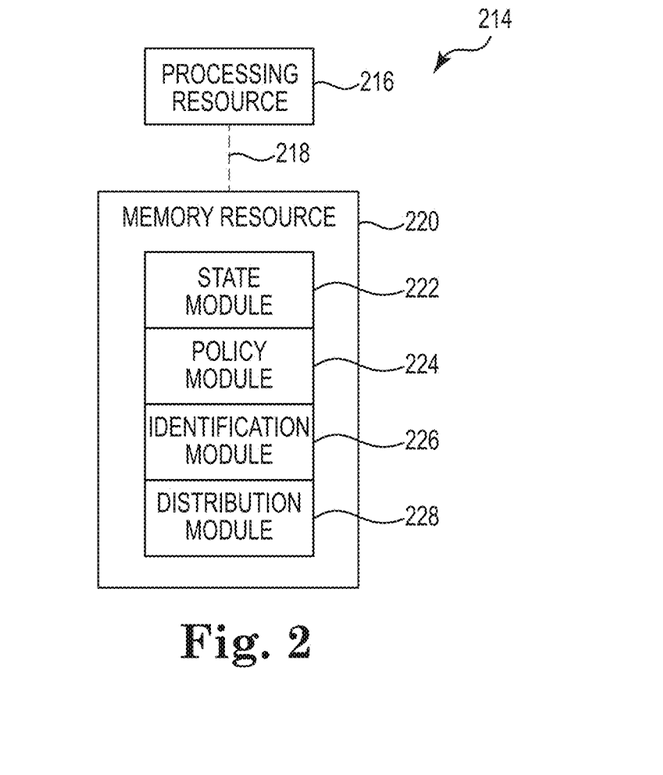
FIG. 2 illustrates a diagram of an example computing device according to the present disclosure.

FIGS. 1 and 2 illustrate examples of systems 100, 214 according to the present disclosure. That is, FIG. 1 illustrates a diagram of an example of a system 100 according to the disclosure. The system 100 can include a database 104, a subsystem 102, and/or a number of engines 106, 108, 110, 112. The subsystem 102 can include the number of engines in communication with the database 104 via a communication link. The system 100 can include additional or fewer engines than illustrated to perform the various functions described herein. The system 100 can represent instructions and/or hardware of a network controller (e.g., system 214 as referenced in FIG. 2, etc.).

The number of engines 106, 108, 110, 112 can include a combination of hardware and programming to perform functions including those described herein (e.g., determine a change in a state of a network, determine a number of policy changes based on the change in the state of the network, identify a number of network endpoints that correspond to the number of policy changes, load instructions based on the number of policy changes to the number of endpoints that correspond to the number of policy changes, etc.). The instructions can include instructions (e.g., software, firmware, etc.) stored in a memory resource (e.g., computer readable medium (CRM), machine readable medium (MRM), etc.) as well as hard-wired program (e.g., logic).

The state engine 106 can include hardware and/or a combination of hardware and instructions to determine a change in a state of a network. Determining a change in the state of a network can include determining a network policy change, determining an application change, determining an extensibility change, determining a domain change, determining an endpoint change, determining a device change, and/or determining a service group member change, among other changes to software or hardware within the network. In some examples, a change in the state of the network can include a number of new or altered network policies that correspond to the change in the state of the network.

The policy engine 108 can include hardware and/or a combination of hardware and instructions to determine a number of policy changes based on the change in the state of the network. The number of policy changes can include a number of OMUs that can be translated to instructions that can be distributed to a number of network devices (e.g., end devices, hosts, routers, switches, etc.). In some examples, the change in the state of the network can be utilized to identify a number of network devices that correspond to the number of policy changes. The number of network devices that correspond to the number of policy changes can be network devices that are relevant to the number of policies.

The identification engine 110 can include hardware and/or a combination of hardware and instructions to identify a number of network endpoints that correspond to the number of policy changes. The number of network endpoints can include a number of edge devices and/or host devices that are utilizing the network. In some examples, the number of network endpoints can change a physical location and utilize different network devices within the network. In some examples, identifying the number of network endpoints can also include identifying a number of different locations of the number of network endpoints and different network devices that correspond to the different locations. That is, identifying the number of network endpoints can include identifying current and previous locations of the number of network endpoints and corresponding network devices being utilized at the current and previous locations.

The distribution engine 112 can include hardware and/or a combination of hardware and instructions to load instructions based on the number of policy changes to the number of endpoints that correspond to the number of policy changes. Loading the instructions based on the number of policy changes can include loading instructions based on the number of policy changes to only network endpoints that are relevant to the number of policy changes. In some examples, the network endpoints that correspond to the number of policy changes can include endpoints where the number of policy changes are to be instantiated.

That is, previous systems and methods can include compiling all OMUs and/or policies when there is a policy alteration based on a network state change, then distributing the compiled OMUs to the network devices. Computing resources can be saved by loading instructions to only network endpoints and other network devices that are relevant to the number of policy changes.

FIG. 2 illustrates a diagram of an example computing device 214 according to the present disclosure. The computing device 214 can utilize instructions (e.g., software and/or firmware) hardware, and/or logic to perform a number of functions including those described herein. The computing device 214 can be a combination of hardware and program instructions configured to share information. The hardware, for example, can include a processing resource 216 and/or a memory resource 220 (e.g., CRM, MRM, database, etc.).

A processing resource 216, as used herein, can include a processor capable of executing instructions stored by a memory resource 220. Processing resource 216 may be implemented in a single device or distributed across multiple devices. The program instructions (e.g., computer readable instructions (CRI)) can include instructions stored on the memory resource 220 and executable by the processing resource 216 to implement a desired function (e.g., resolve a detected conflict between a first network policy and a second network policy).

The memory resource 220 can be in communication with a processing resource 216. A memory resource 220, as used herein, can include memory components capable of storing instructions that can be executed by processing resource 216. Such memory resource 220 can be a non-transitory CRM or MRM. Memory resource 220 may be integrated in a single device or distributed across multiple devices. Further, memory resource 220 may be fully or partially integrated in the same device as processing resource 216 or it may be separate but accessible to that device and processing resource 216. Thus, it is noted that the computing device 214 may be implemented on a participant device, on a server device, on a collection of server devices, and/or a combination of the user device and the server device.

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, and/or removable storage medium in communication with the processing resource 216 via the electronic bus.

A module and/or modules 222, 224, 226, 228 can include CRI that when executed by the processing resource 216 can perform a number of functions including those described herein (e.g., identify a number of network changes, determine a number of endpoints from a plurality of endpoints that correspond to the number of network changes, apply a number of policy changes based on the number of network changes to the number of endpoints that correspond to the number of network changes, load instructions based on the number of policy changes to the number of endpoints that correspond to the number of network changes, etc.). The number of modules 222, 224, 226, 228 can be sub-modules of other modules. For example, the state module 222 and policy module 224 can be sub-modules and/or contained within the same computing device. In another example, the number of modules 222, 224, 226, 228 can comprise individual modules at separate and distinct locations (e.g., CRM, etc.).

Each of the number of modules 222, 224, 226, 228 can include instructions that when executed by the processing resource 216 can function as a corresponding engine as described herein. For example, the state module 222 can include instructions that when executed by the processing resource 216 can function as the state engine 106. In another example, the policy module 224 can include instructions that when executed by the processing resource 216 can function as the policy engine 108.

Figure 3:
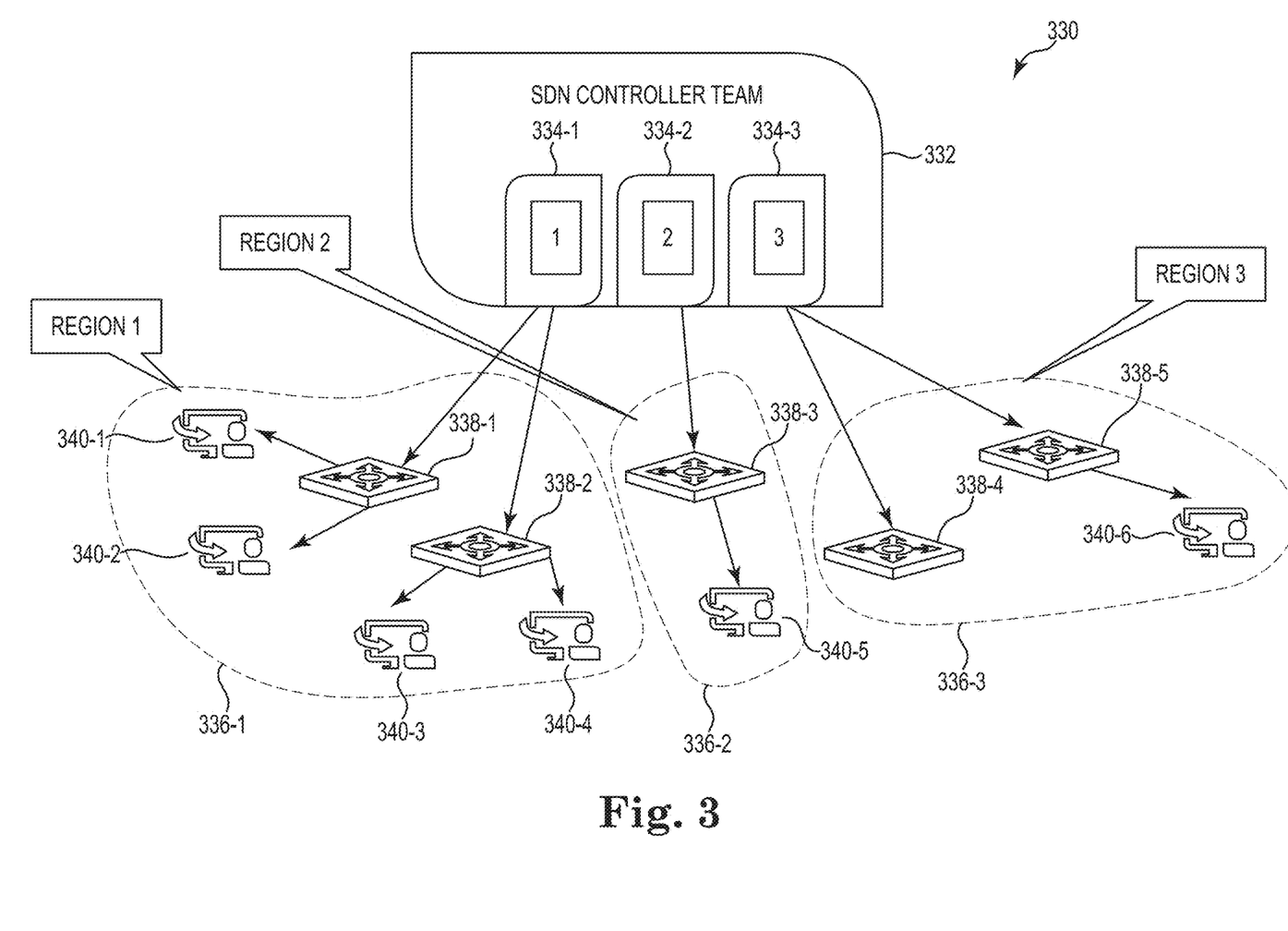
FIG. 3 illustrates event categorization according to the present disclosure.

FIG. 3 illustrates event categorization 330 according to the present disclosure. The event categorization 330 can represent an SDN network with an SDN controller team 332 that can include a number of SDN controllers 334-1, 334-2, 334-3 (e.g., SDN members, etc.). In some examples, the number of SDN controllers 334-1, 334-2, 334-3 can each be utilized to control a particular region 336-1, 336-2, 336-3 of the network.

The number of SDN controllers 334-1, 334-2, 334-3 can be utilized to instruct a number of network devices 338-1, 338-2, 338-3, 338-4, 338-5. For example, the number of SDN controllers 334-1, 334-2, 334-3 can be utilized to instruct packet transfer for the number of network devices 338-1, 338-2, 338-3, 338-4, 338-5. That is, the number of SDN controllers 334-1, 334-2, 334-3 can instruct the packet transfer from/to the number of network devices 338-1, 338-2, 338-3, 338-4, 338-5, to/from a number of endpoints 340-1, 340-2, 340-3, 340-4, 340-5, 340-6 (e.g., end devices, host devices, etc.). Even though a number of SDN controllers 334-1, 334-2, 334-3 and network devices 338-1, 338-2, 338-3, 338-4, 338-5 are shown in the event categorization 330, there can be a greater number or fewer number of SDN controllers 334-1, 334-2, 334-3 and network devices 338-1, 338-2, 338-3, 338-4, 338-5.

The SDN controller team 332 can be responsible for compiling a number of policies as described herein. The number of policies can utilize application service groups. That is, the number of policies can be applied to a particular region 336-1, 336-2, 336-3 and/or be relevant to a particular region 336-1, 336-2, 336-3. The number of policies can contain a number of instructions. For example, the number of policies can include, but are not limited to a group of source endpoints, a group of destination endpoints, traffic classification, and/or message packet context.

Figure 4:
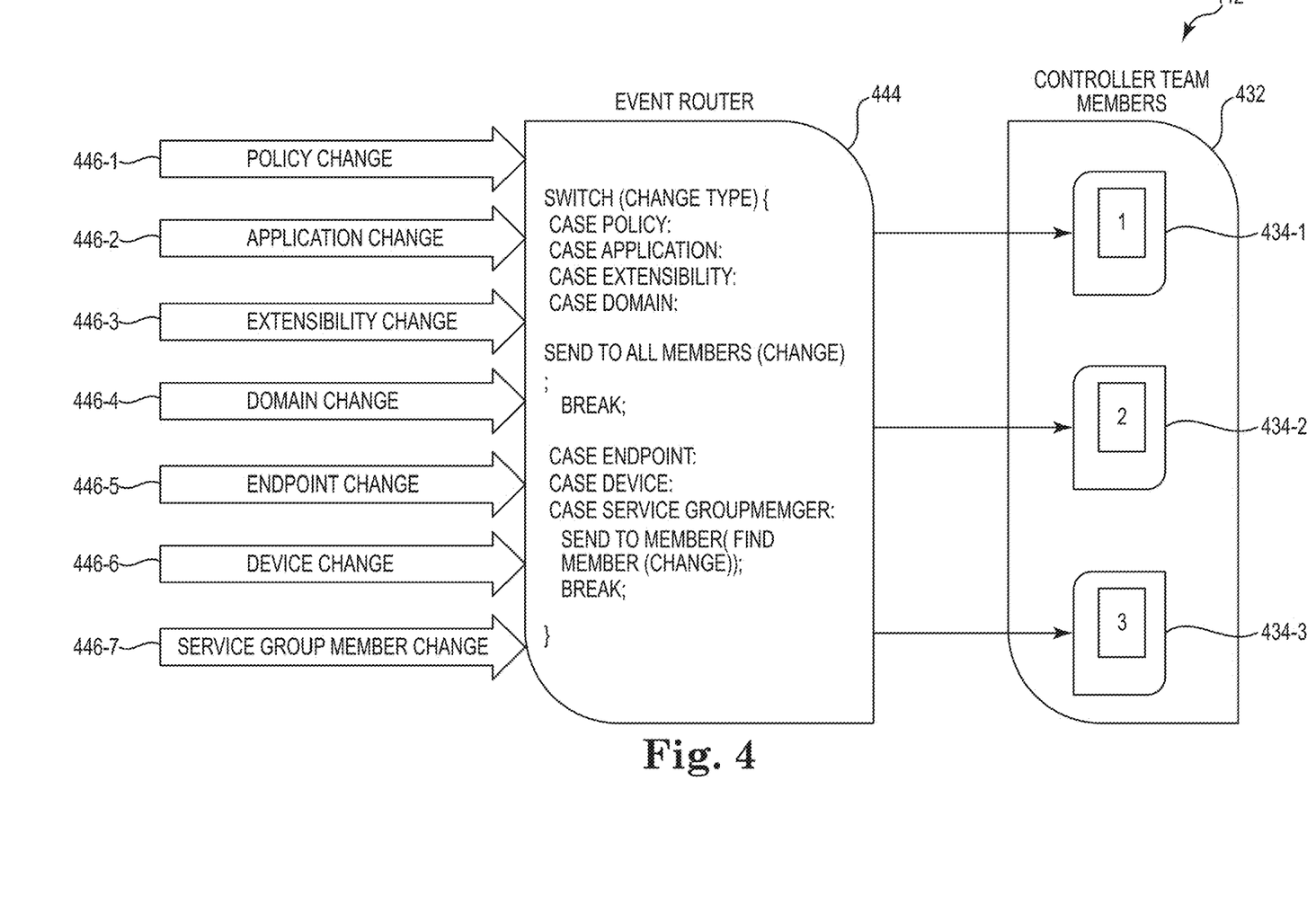
FIG. 4 illustrates an example of policy categorization according to the present disclosure.

FIG. 4 illustrates an example of policy categorization 442 according to the present disclosure. The policy categorization 442 can include a number of network state changes 446-1, 446-2, ..., 446-N. The number of network state changes can include, but are not limited to: policy changes 446-1, application changes 446-2, extensibility changes 446-3, domain changes 446-4, endpoint changes 446-5, device changes 446-6, and/or service group member changes 446-7.

The number of network state changes 446-1, 446-2, ..., 446-N can be received by an event router 444. The number of network state changes 446-1, 446-2, ..., 446-N can correspond to a number of network change categories. The event router 444 can be utilized to determine which of the controller team 432 correspond to the received network state changes 446-1, 446-2, ..., 446-N. For example, the event router 444 can determine a number of endpoints that correspond to each of the number of controller team 432. In this example, the event router 444 can utilize the determined number of endpoints to determine what network state changes 446-1, 446-2, ..., 446-N are relevant for each of the controller team 432. As used herein, an endpoint can correspond to a controller team member 434-1, 434-2, 434-3 when the controller team member 434-1, 434-2, 434-3 is in control of a region which includes or contains the network device to which the endpoint is connected.

The event router 444 can determine a number of network state changes 446-1, 446-2, ..., 446-N that include policy changes that affect and/or are related to network devices corresponding to all of the number of controller team 432. For example, the policy changes 446-1, application changes 446-2, extensibility changes 446-3 and domain changes 446-4 can be relevant to all controller team 432. In this example, the policy changes 446-1, application changes 446-2, extensibility changes 446-3 and domain changes 446-4 can be sent to controller team member 434-1, controller team member 434-2, and controller team member 434-3. In this example, each controller can translate the received state changes to instructions and send the instructions to a number of corresponding network devices within each corresponding region of the controller team 432.

The event router 444 can determine a portion of the controller team 432 correspond to particular network state changes 446-1, 446-2, ..., 446-N. For example, an endpoint change 446-5 can be received by the event router 444 and the event router 444 can determine that the endpoint change 446-5 relates to a particular endpoint that is controlled by controller team member 434-2. In this example, the policy changes relating to the endpoint change 446-5 be sent to controller team member 434-2 and distributed to a number of network devices within the region of the network controlled by the controller team member 434-2. That is, the controller team member 434-2 can translate the policy changes into instructions and send the instructions to a number of network devices that relate to the policy changes.

In some examples, a compilation process to compile the network policy changes can be performed individually by each of the number of controller team members 434-1, 434-2, 434-3. In some examples, a number of policies that are applied at a source endpoint can be compiled on controller team members 434-1, 434-2, 434-3 and the sources can be identified within the number of policies. In addition, a number of policies that are applied at a destination endpoint can be compiled on controller team members 434-1, 434-2, 434-3 and the destinations can be identified within the number of policies. In some examples, intermediate compilation can be stopped for a policy when either the source or the destination endpoints become empty.

The policy categorization 442 can be utilized to adjust network policies for the network more efficiently by not compiling all policies for the network when a network policy is edited (e.g., changed) or added. In addition, the policy categorization 442 can be utilized to send only edited or new network policies to particular network devices that relate to the edited or new network policies.

Figure 5:
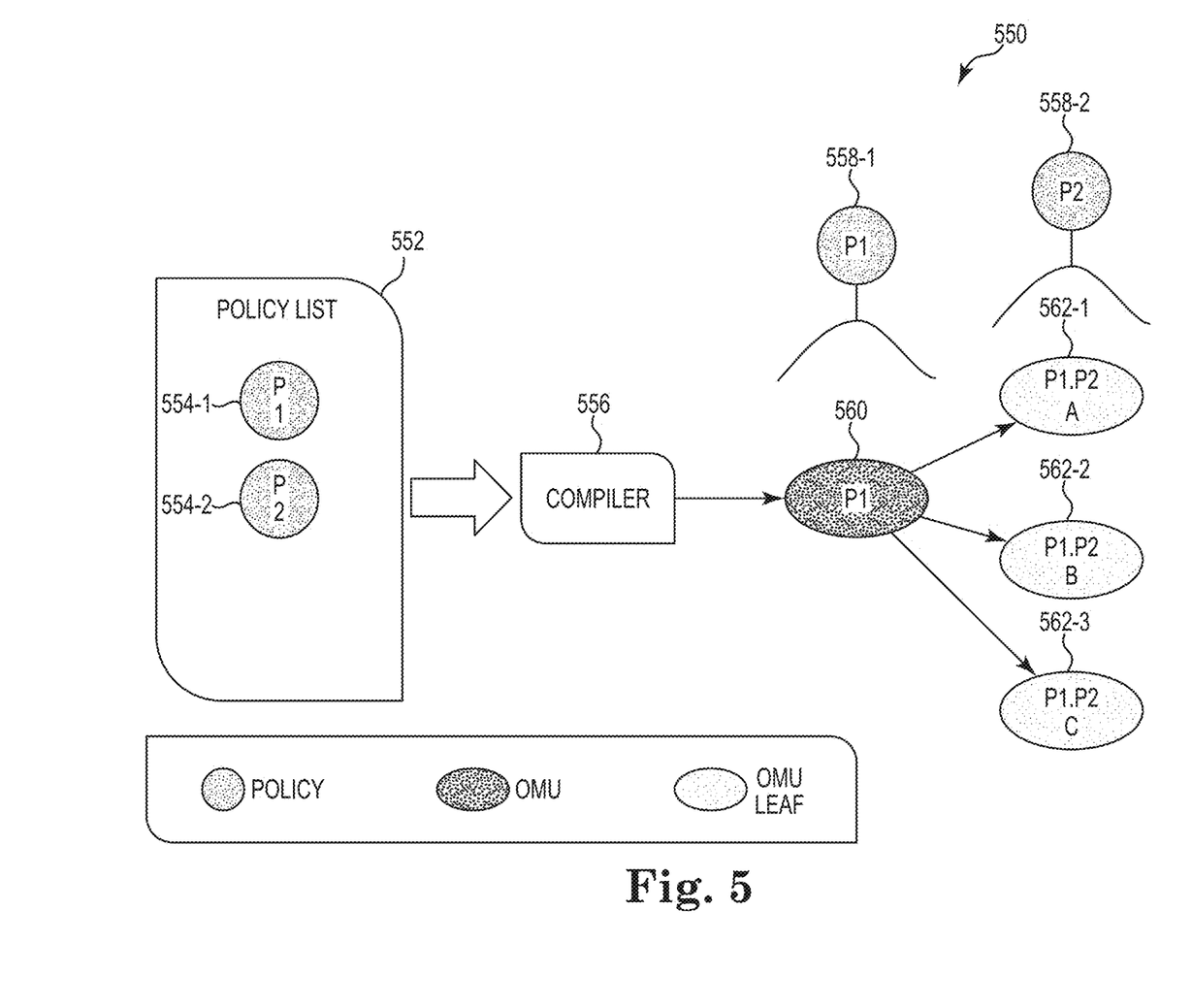
FIG. 5 illustrates an example of a policy tree according to the present disclosure.

FIG. 5 illustrates an example of a policy tree 550 according to the present disclosure. The policy tree 550 can include a policy list 552. The policy list 552 can include a number of policies 554-1, 554-2. In some examples the number of policies 554-1, 554-2 can have overlapping packet transitions (e.g., packet can match more than one policy, etc.).

The policy tree 550 can be constructed based on the overlapping packet transitions. In some examples, the number of policies 554-1, 554-2 can be arranged into the policy tree 550 by a compiler 556. The compiler 556 can receive each of the number of policies 554-1, 554-2 and determine the relationships between the number of policies 554-1, 554-2. The relationships between the number of policies 554-1, 554-2 can include the overlapping packet transitions.

The compiler 556 can determine a root node 560 of the policy tree 550. In some examples, the root node 560 can be the first policy 554-1. The root node 560 can be represented as a first level 558-1 of the policy tree 550. The first level 558-1 can represent all nodes related to the first policy 554-1. The compiler 556 can determine a number of child nodes 562-1, 562-2, 562-3 from the root node 560 based on the relationships between the first policy 554-1 represented by the root node 560 and the second policy 554-2 represented by the child nodes 562-1, 562-2, 562-3. In some examples, the child nodes 562-1, 562-2, 562-3 can reflect the set of OMUs which completely represent both the first policy 554-1 and the second policy 554-2.

The second policy 554-2 can include a plurality of child nodes 562-1, 562-2, 562-3 that can be produced by an overlap with the first policy 554-1 and the second policy 554-2 with the first policy 554-1. For example, the second policy 554-2 can overlap with the first policy 554-1 at a first position of the network and be represented by child node 562-1. In addition, the second policy 554-2 can overlap with the first policy 554-1 at a second position of the network and be represented by child node 562-2. Furthermore, the second policy 554-2 can overlap with the first policy 554-1 at a third position of the network and be represented by child node 562-3. Thus, the second level 558-2 can represent a number of child nodes 562-1, 562-2, 562-3 that correspond to a number of overlapping packet transitions between the first policy 554-1 and the second policy 554-2.

The policy tree 550 can be utilized to identify policy changes and/or policy relationships between the number of policies 554-1, 554-2 within the policy list 552. The policy tree 550 can also be utilized to identify endpoints that correspond to the policy changes and/or policy relationships.

Figure 6:
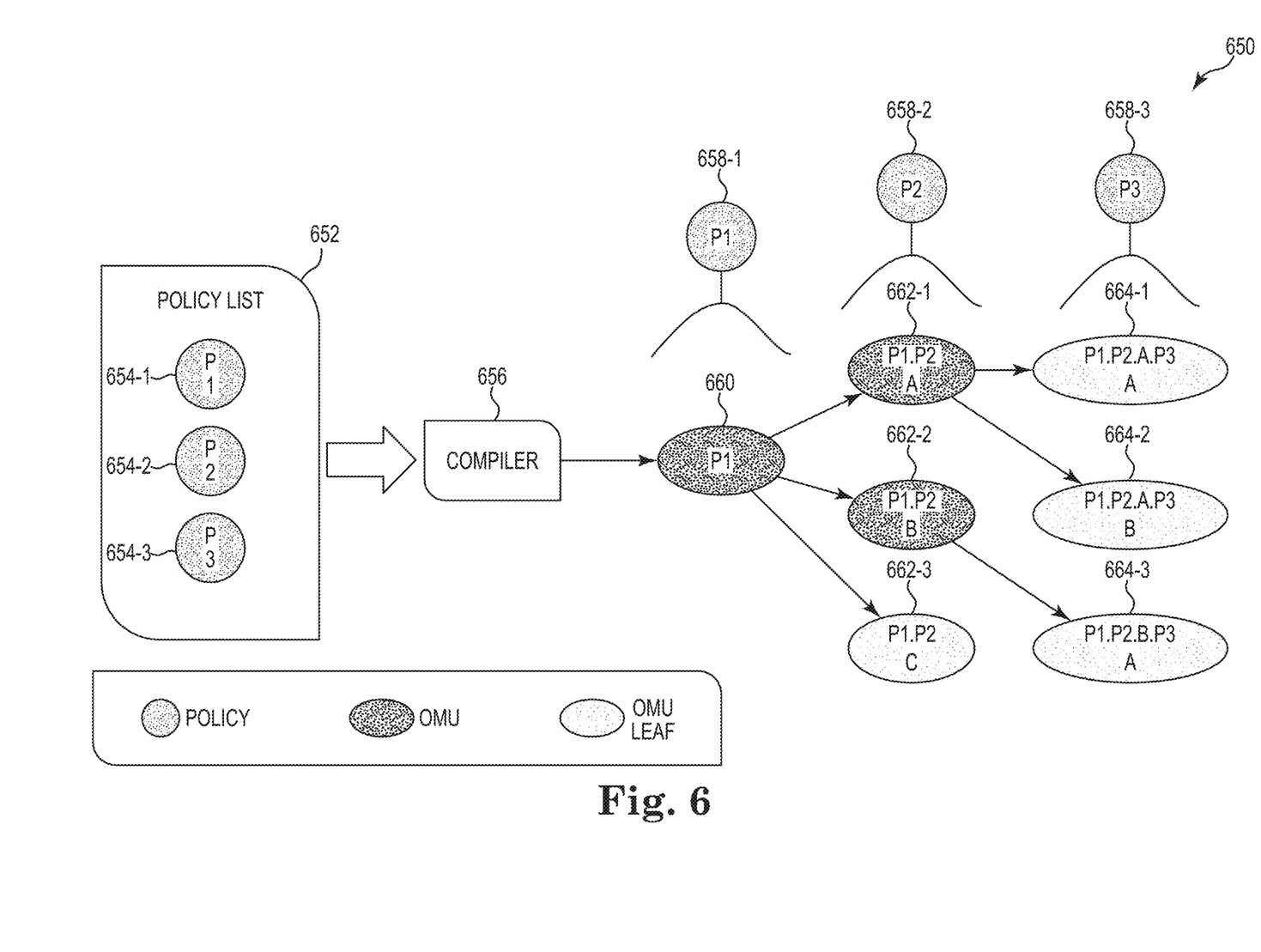
FIG. 6 illustrates an example of a policy tree according to the present disclosure.

FIG. 6 illustrates an example of a policy tree 650 according to the present disclosure. The policy tree 650 can represent the policy tree 550 as represented in FIG. 5 with the addition of a third policy 654-3. That is, the policy tree 650 can represent a policy tree where the compiler 656 identifies policies 654-1, 654-2, 654-3 and organizes the policies 654-1, 654-2, 654-3 in the policy tree 650. In some examples, the policy tree 650 can represent the addition of the third policy 654-3 to the policy tree 550 as referenced in FIG. 5.

As described herein, the compiler 656 can determine a root node 660. In this example, the compiler 656 can determine that the root node 660 is a first policy 654-1. The root node 660 can be on a first level 658-1 that represents the first policy 654-1. The compiler 656 can add a number of child nodes 662-1, 662-2, 662-3 to the root node 660 at a second level 658-2. The number of child nodes 662-1, 662-2, 662-3 can represent the relationships between the first policy 654-1 and the second policy 654-2. As described herein, the relationships can include overlapping packet transitions.

The compiler 656 can add a number of child nodes 664-1, 664-2, 664-3 at a third level 658-3 off of the number of child nodes 662-1, 662-2, 662-3 at the second level 658-2. The compiler 656 can add the number of child nodes 664-1, 664-2, 664-3 based on a relationship between the first policy 654-1, the second policy 654-2, and the third policy 654-3. For example, the child node 664-1 can be a child node off of child node 662-1. In this example, there can be a relationships between the first policy 654-1 represented by root node 660 at the first level 658-1, the second policy 654-2 represented by the first child node 662-1 at the second level 658-2, and the third policy 654-3 represented by the first child node 664-1 at the third level 658-3.

Based on the policy tree 650 it can be determined that there is not a relationship between the third child node 662-3 at the second level 658-2 and the third policy 654-3. Thus, the policy tree 650 can be utilized to determine relationships between the number of policies 652 and determine how new or altered policies are related to existing policies. As described further in reference to FIG. 7, the new or altered policies can be added to the policy tree 650 to determine what endpoints are related to the new or altered policies. The new or altered policies can be distributed to the endpoints that are related to the new or altered policies.

Figure 7:
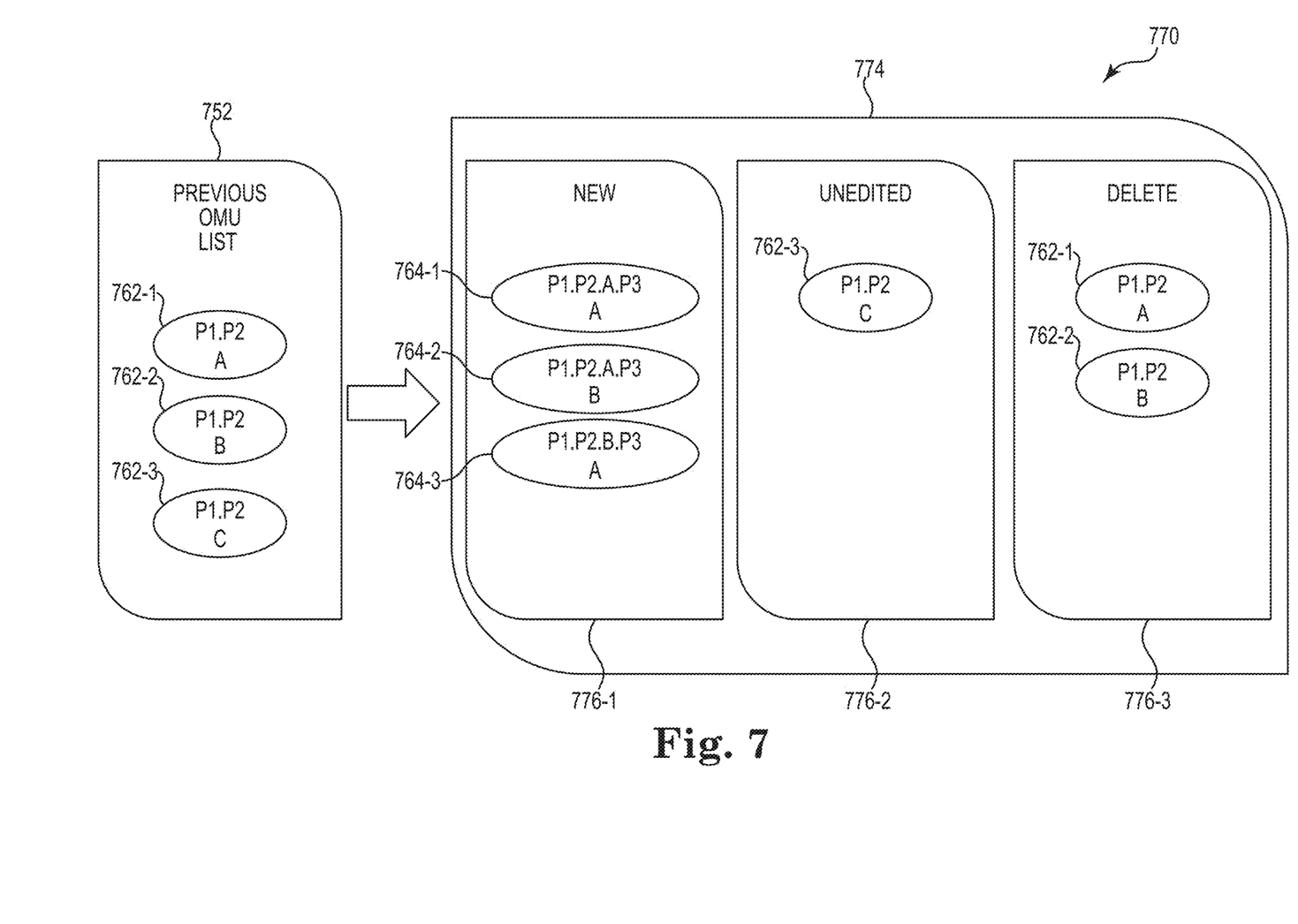
FIG. 7 illustrates an example of a policy compilation result according to the present disclosure.

FIG. 7 illustrates an example of a policy compilation result 770 according to the present disclosure. The policy compilation result 770 is an example policy compilation based on the addition of the third policy 654-3 to the policy tree 650 as referenced in FIG. 6. The policy compilation result 770 can include a previous OMU list 772.

The previous OMU list 772 can include a number of child nodes 762-1, 762-2, 762-3. The number of child nodes 762-1, 762-2, 762-3 can include the relationship information between the number of policies represented by the number of child nodes 762-1, 762-2, 762-3. For example, child node 762-1 can include a relationship between a first policy that is a root node and a second policy that is a child node of the root node. In addition, the child node 762-1 can include information that it is a first child node 762-1 of a second level (e.g., second level 658-2 as referenced in FIG. 6, etc.). In some examples, the child nodes 762-1, 762-2, 762-3 can be leaf nodes of the policy tree (e.g. external nodes). That is, the child nodes 762-1, 762-2, 762-3 have no child nodes in the policy tree.

The previous OMU list 772 can be compared to a current OMU list that includes the added network policy (e.g., third policy 654-3 added to policy tree 650 as referenced in FIG. 6). The added network policy can include a number of child nodes that were added to the number of nodes of the previous OMU list 772. The policy compilation result 770 can include a node update chart 774. The node update chart 774 can include a number of policy change lists 776-1, 776-2, 776-3. The number of policy change lists 776-1, 776-2, 776-3 can include, but is not limited to a new list 776-1, an unedited list 776-2 (e.g., unchanged list), a delete list 776-3, and/or an edited list (not shown). In some examples, any of the edited/updated policies can be represented with a "delete" of the previous policy and new polices to replace the deleted policies can be represented by "new".

The new list 776-1 can include nodes 764-1, 764-2, 764-3 of the policy tree that have been added to the policy tree with the addition of the new policy. For example, the new list 776-1 can include nodes that have been added to an additional level of the policy tree that represents the added policy. The nodes of the new list can include the relationship information for each of the nodes 764-1, 764-2, 764-3. That is, each node 764-1, 764-2, 764-3 can include a representation of a location of the node within the policy tree (e.g., parent nodes, node level, etc.). The unedited list 776-2 can include nodes 762-3 that have not been changed or altered with the addition of the new policy. For example, the unedited list 776-2 can include node 762-3. In this example, node 762-3 can be a node that does not have any overlapping packet transitions with the new policy. That is, there are no child nodes added to the node 762-3 with the addition of the nodes corresponding to the new policy. Thus, the node 762-3 is still a leaf node that includes all relevant information corresponding to the relationship between the first policy and the second policy as described herein.

The delete list 776-3 can include a number of nodes that are no longer leaf nodes (e.g., the lowest child nodes of the policy tree, external nodes). That is, the delete list 776-3 can include nodes that include overlapping packet transitions with the new policy and child nodes can be added to the nodes of the delete list 776-3. Thus, nodes 762-1, 762-2 can have nodes 764-1, 764-2, 764-3 that are added as child nodes to the nodes 762-1, 762-2. In this example, the nodes 764-1, 764-2, 764-3 are now leaf nodes and include relationship information of the child nodes 762-1, 762-2. In some examples, the node update chart 774 can include a change list (not shown). The change list can include a number of nodes that have been altered due to the addition of the new policy.

In some examples, the policy compilation result 770 can include a process that can be repeatable and comparable. For example, the policy compilation result 770 can include running a compilation process at each of the number of controllers (e.g., SDN controller team members 434-1, 434-2, 434-3, etc.). In this example, the process can include ordering the policies in the policy list 752 at each of the number of controllers.

The policy compilation result 770 can be utilized to determine a number of endpoints that relate to the policy changes and/or added policies. For example, the policy compilation result 770 can be utilized to determine a number of endpoints that relate to the addition of a new policy (e.g., the third policy 654-3 as referenced in FIG. 6). The policy compilation result 770 can be utilized to distribute the new policy and/or altered policies to only endpoints and other network devices that relate to the new policy and/or altered policies.

Figure 8:
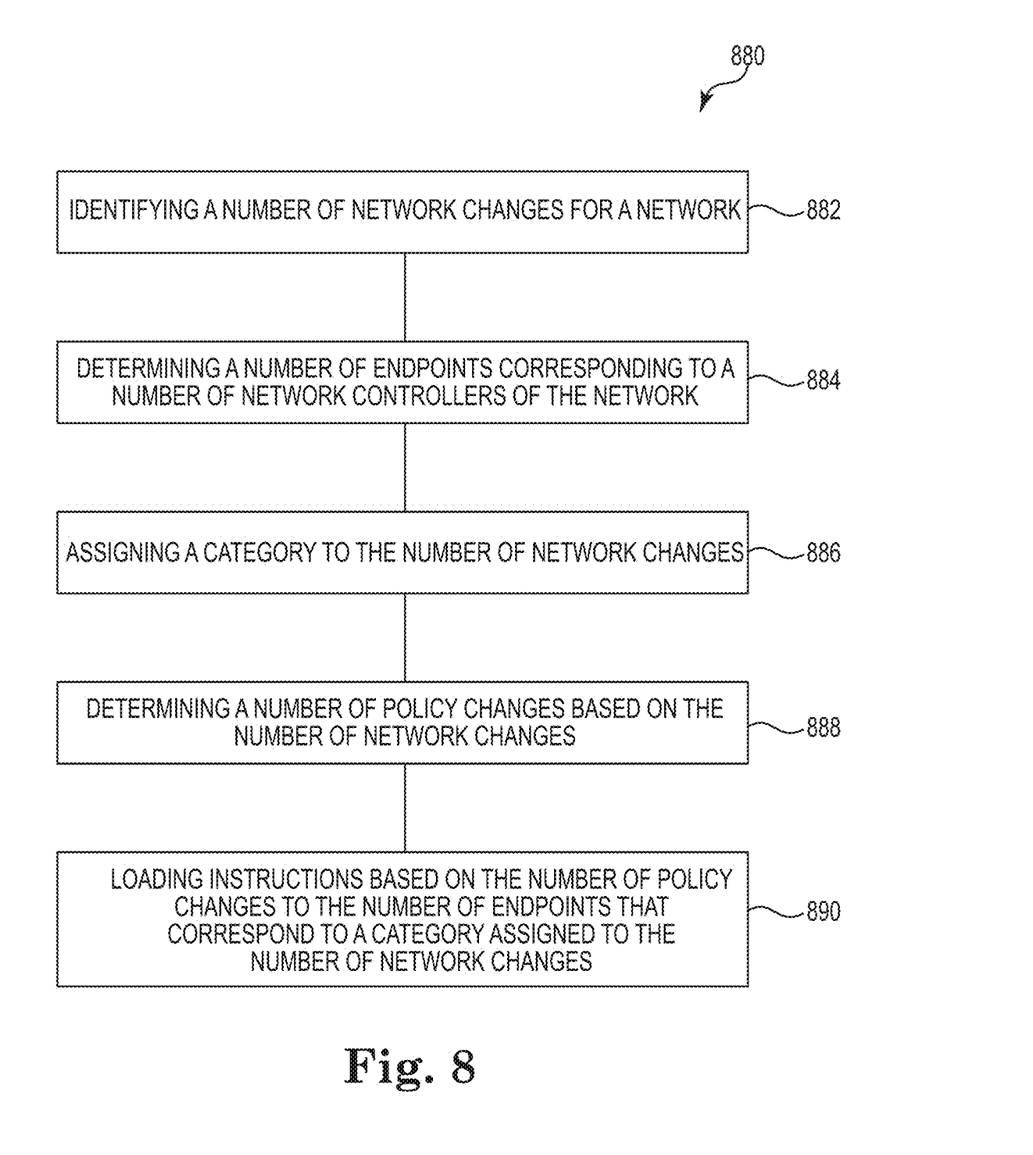
FIG. 8 illustrates a flow chart of an example method for network policy distribution according to the present disclosure.

FIG. 8 illustrates a flow chart of an example method 880 for network policy distribution according to the present disclosure. The method 880 can be executed by a system and/or computing device (e.g., system as referenced in FIG. 1, computing device 214 as referenced in FIG. 2, etc.). For example, the method 880 can be executed by an SDN controller via the system and/or computing device.

At 882 the method 880 can include identifying a number of network changes for a network. Identifying the number of network changes for the network can include identifying changes to the hardware and/or software of the network. For example, the number of network changes can include policy changes, node changes, endpoint changes, among other network changes that can affect network policies.

At 884 the method 880 can include determining a number of endpoints corresponding to a number of network controllers of the network. Determining the number of endpoints corresponding to the number of network controllers can include determining a number of controllers that correspond to the number of endpoints. The number of endpoints can send and/or receive packets within the network and the number of controllers can identify the number of endpoints. In some example, determining the number of policy changes can include comparing a previous list of orthogonal merge units (OMUs) to an updated list of OMUs as described herein in reference to FIG. 7.

At 886 the method 880 can include assigning a category to the number of network changes. Assigning the category to the number of network changes can include determining how the network changes affect the endpoints of the network. For example, the category can identify whether all nodes of the network are related to the network changes. In some examples, the category can indicate a number of network devices that service the number of endpoints. For example, the category can indicate a network state change and/or an SDN controller that controls a particular region of the network.

At 888 the method 880 can include determining a number of policy changes based on the number of network changes. The number of policy changes can include policy additions, alterations, and/or deletions that are related to the number of network changes. For example, an addition of a node can alter a number of policy changes for the network. In this example, the added node can be within a particular region as described herein. In this example, the policy change may only affect the particular region and a policy update can be sent to a corresponding SDN controller for the particular region. In some examples, the number of policy changes can be sent to a portion of the number of network controllers that correspond to the number of endpoints.

At 890 the method 880 can include loading instructions based on the number of policy changes to the number of endpoints that correspond to a category assigned to the number of network changes. As described herein, the number of endpoints that correspond to the category assigned to the number of network changes can include endpoints that are affected by the policy changes. In some examples, endpoints and/or regions that do not correspond to the category may not have instructions loaded.

The method 880 can ensure that compilation is distributed between SDN controllers. The method 880 can also ensure that the compilation of policies does not repeat the same computation arriving at the set of OMUs used to generate device instructions based on the policies. In addition, the method 880 can be utilized to only generate or translate instructions for OMUs needing new instructions. That is, translating the instructions does not include translating the same instructions for the same OMUs that are not altered by the updated network policies. Thus, the method 880 can provide for faster compilation of policies and faster reaction times to network state changes.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "N", "P", and "R", particularly with respect to reference numerals in the drawings, indicate that a number of the particular feature and/or component so designated can be included with a number of examples of the present disclosure. The designators "N", "P", and "R" can refer to a same feature and/or component, or different features and/or components.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:
1. A system, comprising:
a processing resource; and
a memory resource including instructions that, when executed by the processing resource, cause the system to:
determine a number of network changes for a network;
assign a category to the number of network changes;
determine a number of policy changes based on the number of network changes;
identify a number of network endpoints that correspond to the number of network changes; and
load instructions based on the number of policy changes to the number of endpoints that correspond to the category assigned to the number of network changes.

2. The system of claim 1, wherein the network endpoints that correspond to the number of network changes include endpoints that are affected by the number of network changes.

3. The system of claim 1, wherein the network endpoints that correspond to the number of network changes include endpoints where the number of policy changes are to be instantiated.

4. The system of claim 1, wherein the instructions are loaded to only the number of endpoints where the number of policy changes are to be instantiated.

5. The system of claim 4, wherein the instructions are not loaded to the number of endpoints where the policy changes are not to be instantiated.

6. The system of claim 1, wherein the number of endpoints have been located at a plurality of locations within the network.

7. The system of claim 6, wherein the instructions are loaded to each of the plurality of locations where the number of endpoints have been located.

8. A non-transitory computer readable medium storing instructions executable by a processing resource to cause a computer to:
identify a number of network changes;
determine a number of endpoints from a plurality of endpoints that correspond to the number of network changes;
assign a category to the number of network changes;
apply a number of policy changes based on the number of network changes to the number of endpoints that correspond to the number of network changes; and
load instructions based on the number of policy changes to the number of endpoints that correspond to the category assigned to the number of network changes.

9. The medium of claim 8, wherein the number of policy changes include:
new policies;
edited policies;
unedited policies; and
deleted policies.

10. The medium of claim 8, wherein the number of policy changes are put into at least one of a number of categories including:
policy changes;
application changes;
extensibility changes;
domain changes;
endpoint changes;
device changes; and
server group member changes.

11. The medium of claim 10, wherein the number of endpoints that correspond to the number of network changes is based on the category of the number of network changes.

12. A method, comprising:
identifying a number of network changes for a network;
determining a number of endpoints corresponding to a number of network controllers of the network;
assigning a category to the number of network changes;
determining a number of policy changes based on the number of network changes; and
loading instructions based on the number of policy changes to the number of endpoints that correspond to a category assigned to the number of network changes.

13. The method of claim 12, wherein the number of policy changes are sent to a portion of the number of network controllers that correspond to the number of endpoints.

14. The method of claim 12, wherein the category indicates a number of network devices that service the number of endpoints.

15. The method of claim 12, wherein determining the number of policy changes includes comparing a previous list of orthogonal merge units (OMUs) to an updated list of OMUs.

* * * * *